US012770883B2

(12) United States Patent
Kitazawa

(10) Patent No.: US 12,770,883 B2
(45) Date of Patent: Oct. 20, 2026

(54) BINDER FOR SECONDARY BATTERY FUNCTIONAL LAYER, SLURRY COMPOSITION FOR SECONDARY BATTERY FUNCTIONAL LAYER, FUNCTIONAL LAYER FOR SECONDARY BATTERY, AND SECONDARY BATTERY

(71) Applicant: ZEON CORPORATION, Tokyo (JP)

(72) Inventor: Yuzo Kitazawa, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 430 days.

(21) Appl. No.: 18/578,845

(22) PCT Filed: Jul. 27, 2022

(86) PCT No.: PCT/JP2022/029032

§ 371 (c)(1),
(2) Date: Jan. 12, 2024

(87) PCT Pub. No.: WO2023/008502

PCT Pub. Date: Feb. 2, 2023

(65) Prior Publication Data

US 2024/0387824 A1 Nov. 21, 2024

(30) Foreign Application Priority Data

Jul. 30, 2021 (JP) ................................ 2021-126237

(51) Int. Cl.

*H01M 4/62* (2006.01)
*H01M 10/052* (2010.01)
*H01M 50/443* (2021.01)
*H01M 50/449* (2021.01)

(52) U.S. Cl.

CPC ......... *H01M 4/622* (2013.01); *H01M 10/052* (2013.01); *H01M 50/443* (2021.01); *H01M 50/449* (2021.01)

(58) Field of Classification Search

CPC .. H01M 4/622; H01M 10/052; H01M 50/443; H01M 50/449; H01M 50/414; H01M 50/42; H01M 50/403; H01M 50/434; H01M 50/446; H01M 50/451; H01M 50/461; H01M 4/362

See application file for complete search history.

(56) References Cited

U.S. PATENT DOCUMENTS

| | | | |
|---|---|---|---|
| 8,852,788 B2 | 10/2014 | Wakizaka et al. | |
| 10,418,607 B2 | 9/2019 | Matsumura | |
| 2011/0318630 A1 | 12/2011 | Wakizaka et al. | |
| 2012/0189898 A1 | 7/2012 | Wakizaka et al. | |
| 2013/0280584 A1 | 10/2013 | Matsumura | |
| 2019/0319236 A1* | 10/2019 | Tanaka | B01J 13/185 |

FOREIGN PATENT DOCUMENTS

| | | |
|---|---|---|
| CN | 102334215 A | 1/2012 |
| JP | 5765228 B2 | 8/2015 |
| JP | 5867731 B2 | 2/2016 |
| KR | 1020140003429 A | 1/2014 |
| WO | 2012073996 A1 | 6/2012 |

OTHER PUBLICATIONS

Sep. 9, 2025, the Extended European Search Report issued by the European Patent Office in the corresponding European Patent Application No. 22849563.6.

Jan. 18, 2024, International Preliminary Report on Patentability issued in the International Patent Application No. PCT/JP2022/029032.

* cited by examiner

*Primary Examiner* — Stewart A Fraser

(74) *Attorney, Agent, or Firm* — KENJA IP LAW PC

(57) ABSTRACT

A binder for a secondary battery functional layer contains a particulate polymer that includes a cyano group-containing monomer unit and a cyclic ether-containing monomer unit and that, in an infrared absorption spectrum, has a light absorbance ratio A1/A2 of 5 or more between a maximum value A1 of light absorbance in a range of not less than 880 $cm^{-1}$ and not more than 930 $cm^{-1}$ and a maximum value A2 of light absorbance in a range of not less than 2210 $cm^{-1}$ and not more than 2270 $cm^{-1}$.

11 Claims, No Drawings

BINDER FOR SECONDARY BATTERY FUNCTIONAL LAYER, SLURRY COMPOSITION FOR SECONDARY BATTERY FUNCTIONAL LAYER, FUNCTIONAL LAYER FOR SECONDARY BATTERY, AND SECONDARY BATTERY

TECHNICAL FIELD

The present disclosure relates to a binder for a secondary battery functional layer, a slurry composition for a secondary battery functional layer, a functional layer for a secondary battery, and a secondary battery.

BACKGROUND

Secondary batteries such as lithium ion secondary batteries have characteristics such as compact size, light weight, high energy-density, and the ability to be repeatedly charged and discharged, and are used in a wide range of applications. A secondary battery generally includes battery members such as electrodes (positive electrode and negative electrode) and a separator that isolates the positive electrode and the negative electrode from each other and prevents short-circuiting between the positive and negative electrodes.

A battery member of a secondary battery may be a member that includes a functional layer containing a binding material and optionally containing particles (hereinafter, referred to as "functional particles") that are compounded in order to cause the battery member to display a desired function.

Specifically, a separator that includes an adhesive layer containing a binding material or a porous membrane layer containing a binding material and non-conductive particles as functional particles on a separator substrate may be used as a separator of a secondary battery. Moreover, an electrode that includes an adhesive layer or porous membrane layer such as described above on an electrode substrate having an electrode mixed material layer provided on a current collector may be used as an electrode of a secondary battery.

Attempts have been made to enhance binding materials with the aim of achieving further improvement of secondary battery performance. As one example, Patent Literature (PTL) 1 discloses an idea of using, as a binder of a porous membrane for a secondary battery, polymer particles that have a heterophase structure in which the chemical composition differs between an outer layer and an inner layer and in which the outer layer is obtained through polymerization of a monomer composition containing a (meth)acrylonitrile monomer and an epoxy group-containing monomer. As another example, PTL 2 discloses an idea of forming a secondary battery porous membrane by using a binder that is obtained through polymerization of a monomer composition containing an α,β-unsaturated nitrile monomer and an epoxy group-containing monomer in combination with electrically insulating inorganic particles having a specific surface functional group.

CITATION LIST

Patent Literature

PTL 1: JP5765228B2

PTL 2: JP5867731B2

SUMMARY

Technical Problem

There is room for improvement of heat shrinkage resistance of a functional layer that is formed using a binder of the conventional techniques described above. There is also room for further improvement of adhesiveness of a functional layer that is formed using a binder of the conventional techniques described above.

Accordingly, one object of the present disclosure is to provide a binder for a secondary battery functional layer that is capable of forming a functional layer having excellent heat shrinkage resistance and adhesiveness.

Another object of the present disclosure is to provide a slurry composition for a secondary battery functional layer that is capable of forming a functional layer having excellent heat shrinkage resistance and adhesiveness.

Another object of the present disclosure is to provide a functional layer for a secondary battery having excellent heat shrinkage resistance and adhesiveness.

Another object of the present disclosure is to provide a secondary battery including this functional layer.

Solution to Problem

The inventor(s) conducted diligent investigation with the aim of solving the problems set forth above. The inventor(s) made a new discovery that it is possible to increase heat shrinkage resistance and adhesiveness of a functional layer by using a binder that contains a particulate polymer satisfying a specific chemical composition and infrared absorption spectrum characteristic, and, in this manner, completed the present disclosure.

Specifically, the present disclosure aims to advantageously solve the problems set forth above, and [1] a presently disclosed binder for a secondary battery functional layer comprises a particulate polymer, wherein the particulate polymer includes a cyano group-containing monomer unit and a cyclic ether-containing monomer unit, and in an infrared absorption spectrum of the particulate polymer, a light absorbance ratio A1/A2 of a maximum value A1 of light absorbance in a range of not less than 880 $cm^{-1}$ and not more than 930 $cm^{-1}$ and a maximum value A2 of light absorbance in a range of not less than 2210 $cm^{-1}$ and not more than 2270 $cm^{-1}$ is 5 or more. By using a binder that contains a particulate polymer satisfying the specific chemical composition and infrared absorption spectrum characteristic set forth above, it is possible to form a functional layer having excellent heat shrinkage resistance and adhesiveness.

Note that the phrase "includes a monomer unit" as used in the present disclosure means that "a polymer obtained using that monomer includes a repeating unit derived from the monomer".

Also note that an infrared absorption spectrum of a particulate polymer can be measured according to a method described in the EXAMPLES section.

[2] In the presently disclosed binder for a secondary battery functional layer according to the foregoing [1], the light absorbance ratio A1/A2 is preferably 20 or less. When the light absorbance ratio A1/A2 of the particulate polymer is 20 or less, a functional layer having even better heat shrinkage resistance and adhesiveness can be formed.

[3] The presently disclosed binder for a secondary battery functional layer according to the foregoing [1] or [2] preferably further comprises water and has a pH of not lower than 5 and not higher than 9. When the pH of the binder is not lower than 5 and not higher than 9, binder composition preservation stability can be increased.

[4] In the presently disclosed binder for a secondary battery functional layer according to any one of the foregoing [1] to [3], the particulate polymer preferably has a glass-transition temperature of 20° C. or lower. When the glass-transition temperature of the particulate polymer is not higher than the specific value set forth above, adhesiveness of a functional layer can be even further increased.

Note that the "glass-transition temperature" of a particulate polymer referred to in the present disclosure can be measured by a method described in the EXAMPLES section of the present specification.

[5] In the presently disclosed binder for a secondary battery functional layer according to any one of the foregoing [1] to [4], the particulate polymer preferably has a storage modulus of elasticity at 50° C. of $2\times10^6$ Pa or less. When the storage modulus of elasticity of the particulate polymer at 50° C. is not more than the upper limit set forth above, adhesiveness of a functional layer can be even further increased.

Note that the storage modulus of elasticity of a particulate polymer can be measured according to a method described in the EXAMPLES section.

[6] In the presently disclosed binder for a secondary battery functional layer according to any one of the foregoing [1] to [5], the particulate polymer preferably has a volume-average particle diameter $D^p$ of not less than 0.05 μm and not more than 0.25 μm. When the volume-average particle diameter $D^p$ of the particulate polymer is within the specific range set forth above, adhesiveness of a functional layer can be even further increased, and cycle characteristics of an obtained secondary battery can be enhanced.

Note that the "volume-average particle diameter $D^p$" referred to in the present disclosure represents the particle diameter at which, in a particle size distribution (by volume) measured by laser diffraction, cumulative volume calculated from a small diameter end of the distribution reaches 50%.

[7] Moreover, the present disclosure aims to advantageously solve the problems set forth above, and a presently disclosed binder for a secondary battery functional layer according to any one of the foregoing [1] to [6] comprises: any one of the binders set forth above; a solvent; and functional particles. By using a slurry composition that contains any one of the binders set forth above, a solvent, and functional particles, it is possible to form a functional layer having excellent heat shrinkage resistance and adhesiveness.

[8] In the presently disclosed slurry composition for a secondary battery functional layer according to the foregoing [7], the functional particles may include non-conductive particles. The presently disclosed slurry composition for a secondary battery functional layer that contains non-conductive particles as functional particles can suitably be used to form a porous membrane layer.

[9] In the presently disclosed slurry composition for a secondary battery functional layer according to the foregoing [7] or [8], a ratio $D^n/D^p$ of a volume-average particle diameter $D^n$ of the non-conductive particles and a volume-average particle diameter $D^p$ of the particulate polymer is preferably not less than 2.0 and not more than 7.0. When the ratio $D^n/D^p$ of volume-average particle diameters is within the range set forth above, it is possible to form a functional layer having an excellent balance of heat shrinkage resistance and adhesiveness.

Note that the "volume-average particle diameter $D^n$" referred to in the present disclosure represents the particle diameter at which, in a particle size distribution (by volume) measured by laser diffraction, cumulative volume calculated from a small diameter end of the distribution reaches 50%.

[10] Furthermore, the present disclosure aims to advantageously solve the problems set forth above, and a presently disclosed functional layer is formed by the slurry composition for a secondary battery functional layer a secondary battery according to any one of the foregoing [7] to [9]. A functional layer that is formed from the slurry composition set forth above has excellent heat shrinkage resistance and adhesiveness.

[11] Also, the present disclosure aims to advantageously solve the problems set forth above, and a presently disclosed secondary battery comprises the functional layer for a secondary battery according to the foregoing [10]. A secondary battery that includes the functional layer set forth above can display excellent battery performance.

Advantageous Effect

According to the present disclosure, it is possible to provide a binder for a secondary battery functional layer that is capable of forming a functional layer having excellent heat shrinkage resistance and adhesiveness.

Moreover, according to the present disclosure, it is possible to provide a slurry composition for a secondary battery functional layer that is capable of forming a functional layer having excellent heat shrinkage resistance and adhesiveness.

Furthermore, according to the present disclosure, it is possible to provide a functional layer for a secondary battery having excellent heat shrinkage resistance and adhesiveness.

Also, according to the present disclosure, it is possible to provide a secondary battery including this functional layer.

DETAILED DESCRIPTION

The following provides a detailed description of embodiments of the present disclosure.

The presently disclosed binder for a secondary battery functional layer (hereinafter, also referred to simply as a "binder") is a binder that may be used in an application of producing any functional layer having a function such as reinforcement or adhesion inside of a secondary battery. For example, the presently disclosed binder for a secondary battery functional layer can be used in production of the presently disclosed slurry composition for a secondary battery functional layer (hereinafter, also referred to simply as a "slurry composition"). Moreover, the presently disclosed slurry composition for a secondary battery functional layer can be used in formation of a functional layer such as described above. Furthermore, the presently disclosed functional layer for a secondary battery is formed from the presently disclosed slurry composition for a secondary battery functional layer. Also, the presently disclosed secondary battery includes the presently disclosed functional layer for a secondary battery. For example, the presently disclosed secondary battery may include a positive electrode, a negative electrode, and a separator as battery members, wherein at least one of these battery members includes the presently disclosed functional layer for a secondary battery. In other words, the presently disclosed secondary battery includes a battery member that includes the presently disclosed functional layer.

(Binder for Secondary Battery Functional Layer)

The presently disclosed binder contains a specific particulate polymer. Note that the presently disclosed binder is typically a composition having the particulate polymer dispersed in a solvent such as water. Moreover, the presently disclosed binder may further contain components other than the particulate polymer and the solvent (hereinafter, referred to as "other components").

<Particulate Polymer>

The particulate polymer is a component that functions as a binding material, that imparts adhesiveness to a functional layer formed using a slurry composition that contains the binder, and that also holds components contained in the functional layer (for example, functional particles such as non-conductive particles) so that these components do not detach from the functional layer.

The particulate polymer includes a cyano group-containing monomer unit and a cyclic ether-containing monomer unit. Moreover, a feature of the particulate polymer is that in an infrared absorption spectrum, a light absorbance ratio A1/A2 of a maximum value A1 of light absorbance in a range of not less than 880 $cm^{-1}$ and not more than 930 $cm^{-1}$ and a maximum value A2 of light absorbance in a range of not less than 2210 $cm^{-1}$ and not more than 2270 $cm^{-1}$ is 5 or more. The particulate polymer may further include monomer units other than a cyano group-containing monomer unit and a cyclic ether-containing monomer unit (hereinafter, referred to as "other monomer units").

As a result of the presently disclosed binder containing a particulate polymer that satisfies the chemical composition and characteristic described above, a functional layer that is formed using the presently disclosed binder can display excellent heat shrinkage resistance and adhesiveness. Moreover, the presently disclosed binder has excellent preservation stability.

The reason that heat shrinkage resistance and adhesiveness of a functional layer can be improved through the presently disclosed binder as described above is presumed to be as follows.

Firstly, the particulate polymer in the presently disclosed binder is thought to improve adhesiveness of a functional layer as a result of including a cyano group-containing monomer unit. Moreover, the cyclic ether structure included in the particulate polymer in the presently disclosed binder is presumed to form cross-links with or interact with the surface of a separator substrate or with other components contained in a functional layer. This cross-link formation or interaction is presumed to stabilize the layer structure of the functional layer and thereby improve heat shrinkage resistance and adhesiveness of the functional layer. Furthermore, the light absorbance ratio A1/A2 of the particulate polymer in the presently disclosed binder being 5 or more is presumed to mean that a relationship between the content of cyclic ether structures expressed by a maximum value A1 of light absorbance in a range of not less than 880 $cm^{-1}$ and not more than 930 $cm^{-1}$ in an infrared absorption spectrum and the content of cyano group-containing monomer units expressed by a maximum value A2 of light absorbance in a range of not less than 2210 $cm^{-1}$ and not more than 2270 $cm^{-1}$ in an infrared absorption spectrum is in an appropriate state and that heat shrinkage resistance and adhesiveness of a functional layer can be increased in a good balance.

<<Light Absorbance Ratio of Particulate Polymer>>

In an infrared absorption spectrum of the particulate polymer, a light absorbance ratio A1/A2 of a maximum value A1 of light absorbance in a range of not less than 880 $cm^{-1}$ and not more than 930 $cm^{-1}$ and a maximum value A2 of light absorbance in a range of not less than 2210 $cm^{-1}$ and not more than 2270 $cm^{-1}$ is required to be 5 or more, is preferably 6 or more, and more preferably 8 or more, and is preferably 20 or less, and more preferably 13 or less. When the light absorbance ratio is not less than any of the lower limits set forth above, heat shrinkage resistance and adhesiveness of a functional layer can be increased. Moreover, when the light absorbance ratio is not more than any of the upper limits set forth above, adhesiveness of a functional layer can be increased, and cycle characteristics of an obtained secondary battery can be enhanced.

<<Storage Modulus of Elasticity of Particulate Polymer>>

The storage modulus of elasticity of the particulate polymer at 50° C. is preferably $2\times10^6$ Pa or less, and more preferably $1\times10^6$ Pa or less, and is preferably $1\times10^5$ Pa or more, and more preferably $2\times10^5$ Pa or more. When the storage modulus of elasticity at 50° C. is not less than any of the lower limits set forth above, heat shrinkage resistance and adhesiveness of a functional layer can be increased. Moreover, when the storage modulus of elasticity at 50° C. is not more than any of the upper limits set forth above, adhesiveness of a functional layer can be increased, the particulate polymer can better conform with the surface shape of inorganic particles, and heat shrinkage resistance can be increased. Note that the storage modulus of elasticity of a particulate polymer can be measured according to a method described in the EXAMPLES section.

<<Chemical Composition of Particulate Polymer>>

[Cyano Group-Containing Monomer Unit]

Examples of cyano group-containing monomers that can form a cyano group-containing monomer unit include (meth)acrylonitrile such as acrylonitrile and methacrylonitrile; α-halogenoacrylonitriles such as α-chloroacrylonitrile and α-bromoacrylonitrile; 2-cyanoethyl (meth)acrylate such as 2-cyanoethyl acrylate and 2-cyanoethyl methacrylate; and 2-cyanoethylacrylamide. From a viewpoint of further improving adhesiveness of a functional layer, it is preferable to use (meth)acrylonitrile, and more preferable to use acrylonitrile. One of these cyano group-containing monomers may be used individually, or two or more of these cyano group-containing monomers may be used in combination in a freely selected ratio.

Note that in the present disclosure, "(meth)acrylonitrile" is used to indicate "acrylonitrile" and/or "methacrylonitrile", whereas "(meth)acrylate" is used to indicate "acrylate" and/or "methacrylate".

When all repeating units (all monomer units) included in the particulate polymer are taken to be 100 mass %, the proportional content of cyano group monomer units is preferably 2 mass % or more, and more preferably 5 mass % or more, and is preferably 30 mass % or less, more preferably 25 mass % or less, and even more preferably 18 mass % or less. When the proportional content of cyano group-containing monomer units in the particulate polymer is not less than any of the lower limits set forth above, adhesiveness of a functional layer can be further improved. When the proportional content of cyano group-containing monomer units in the particulate polymer is not more than any of the upper limits set forth above, internal resistance of an obtained secondary battery can be restricted from increasing. Note that the "proportional content (mass %)" of each monomer unit (each repeating unit) included in a polymer can be measured by a nuclear magnetic resonance (NMR) method such as $^1$H-NMR or $^{13}$C-NMR.

[Cyclic Ether-Containing Monomer Unit]

No specific limitations are placed on cyclic ether-containing monomers that can form a cyclic ether-containing monomer unit so long as they are monomers that include a cyclic ether structure. For example, a monomer (epoxy group-containing monomer) that includes an epoxy group (epoxy ring), a monomer (oxetanyl group-containing monomer) that includes an oxetanyl group (oxetane ring), or the like may be used. Of these cyclic ether-containing monomers, it is preferable to use an epoxy group-containing monomer from a viewpoint of further improving heat shrinkage resistance and adhesiveness of a functional layer.

Examples of epoxy group-containing monomers include allyl glycidyl ether, glycidyl (meth)acrylate, 3,4-epoxycyclohexylmethyl methacrylate, and 4-hydroxybutyl acrylate glycidyl ether. Of these examples, allyl glycidyl ether and glycidyl (meth)acrylate are preferable as epoxy group-containing monomers.

When all repeating units (all monomer units) included in the particulate polymer are taken to be 100 mass %, the proportional content of cyclic ether-containing monomer units is preferably 5 mass % or more, and more preferably 10 mass % or more, and is preferably 40 mass % or less, and more preferably 30 mass % or less. When the proportional content of cyclic ether-containing monomer units in the particulate polymer is not less than any of the lower limits set forth above, a functional layer that is formed using the binder can be caused to display excellent heat shrinkage resistance and adhesiveness. On the other hand, when the proportional content of cyclic ether-containing monomer units in the particulate polymer is not more than any of the upper limits set forth above, adhesiveness of a functional layer can be improved.

[Other Monomer Units]

Examples of other monomer units of the particulate polymer besides those described above include a (meth) acrylic acid alkyl ester monomer unit, a carboxyl group-containing monomer unit, and a cross-linkable monomer unit. Note that the previously described cyano group-containing monomers and cyclic ether-containing monomers are not included among (meth)acrylic acid alkyl ester monomers that can form a (meth)acrylic acid alkyl ester monomer unit, carboxyl group-containing monomers that can form a carboxyl group-containing monomer unit, and cross-linkable monomers that can form a cross-linkable monomer unit. Also note that in the present specification, "(meth)acrylic acid" is used to indicate "acrylic acid" and/or "methacrylic acid".

Examples of (meth)acrylic acid alkyl ester monomers that can form a (meth)acrylic acid alkyl ester monomer unit include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, stearyl methacrylate, and glycidyl methacrylate. One of these (meth)acrylic acid alkyl ester monomers may be used individually, or two or more of these (meth)acrylic acid alkyl ester monomers may be used in combination. Of these (meth)acrylic acid alkyl ester monomers, it is preferable to use 2-ethylhexyl acrylate and butyl acrylate from a viewpoint of even further improving adhesiveness of a functional layer and also further improving heat shrinkage resistance of the functional layer.

When all repeating units (all monomer units) included in the particulate polymer are taken to be 100 mass %, the proportional content of (meth)acrylic acid alkyl ester monomer units is preferably 40 mass % or more, and more preferably 50 mass % or more, and is preferably 95 mass % or less, and more preferably 80 mass % or less. When the proportional content of (meth)acrylic acid alkyl ester monomer units in the particulate polymer is not less than any of the lower limits set forth above, adhesiveness of a functional layer can be even further improved. On the other hand, when the proportional content of (meth)acrylic acid alkyl ester monomer units in the particulate polymer is not more than any of the upper limits set forth above, heat shrinkage resistance of a functional layer can be further improved.

Examples of carboxyl-containing monomers that can form a carboxyl group-containing monomer unit include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Moreover, an acid anhydride that produces a carboxyl group through hydrolysis can also be used as a carboxyl group-containing monomer.

One of these carboxyl group-containing monomers may be used individually, or two or more of these carboxyl group-containing monomers may be used in combination.

In a case in which the particulate polymer includes a carboxyl group-containing monomer unit, the proportional content of carboxyl group-containing monomer units is preferably not less than 0.1 mass % and not more than 10 mass % when all repeating units (all monomer units) included in the particulate polymer are taken to be 100 mass % from a viewpoint of even further increasing adhesiveness of a functional layer.

A cross-linkable monomer that can form a cross-linkable monomer unit is a monomer that can form a cross-linked structure during or after polymerization upon heating or irradiation with energy rays.

Examples of cross-linkable monomers that can be used include polyfunctional monomers having at least two groups that display polymerization reactivity in the monomer. Examples of such polyfunctional monomers include divinyl monomers such as divinylbenzene, 1,3-butadiene, isoprene, and allyl methacrylate; di(meth)acrylic acid alkyl ester monomers such as ethylene dimethacrylate, diethylene glycol dimethacrylate, ethylene glycol dimethacrylate (EDMA), diethylene glycol diacrylate, and 1,3-butylene glycol diacrylate; tri(meth)acrylic acid alkyl ester monomers such as trimethylolpropane trimethacrylate and trimethylolpropane triacrylate; N-methylol group-containing monomers such as N-methylol(meth)acrylamide; and γ-methacryloxypropyltrimethoxysilane. One of these polyfunctional monomers may be used individually, or two or more of these polyfunctional monomers may be used in combination. Note that in the present specification, "(meth)acrylamide" is used to indicate "acrylamide" or "methacrylamide".

In a case in which the particulate polymer includes a cross-linkable monomer unit, the proportional content of cross-linkable monomer units is preferably not less than 0.1 mass % and not more than 10 mass % when all repeating units (all monomer units) included in the particulate polymer are taken to be 100 mass % from a viewpoint of even further increasing heat shrinkage resistance and adhesiveness of a functional layer.

<<Structure and Glass-Transition Temperature of Particulate Polymer>>

The glass-transition temperature of the particulate polymer is preferably 20° C. or lower, more preferably 10° C. or lower, and even more preferably 0° C. or lower. When the glass-transition temperature of the particulate polymer is not higher than any of the upper limits set forth above, adhesiveness of a functional layer can be further improved. Although no specific limitations are placed on the lower limit for the glass-transition temperature of the particulate polymer, the lower limit is normally −100° C. or higher.

<<Structure of Particulate Polymer>>

The structure of the particulate polymer that is contained in the presently disclosed binder may be that of a block copolymer, a graft copolymer, a random copolymer, or the like without any specific limitations, though a random copolymer is preferable.

Moreover, although the particulate polymer may have a core-shell structure including a core portion and a shell portion at least partially covering an outer surface of the core portion, it is preferable that the particulate polymer does not have a core-shell structure.

Accordingly, the particulate polymer is particularly preferably a random copolymer that does not have a core-shell structure. Note that in the present specification, a particulate polymer is judged to be a "random copolymer that does not have a core-shell structure" in a situation in which only one glass-transition temperature is detected during glass-transition temperature measurement of the particulate polymer.

<<Volume-Average Particle Diameter of Particulate Polymer>>

The volume-average particle diameter $D^p$ of the particulate polymer is preferably 0.05 μm or more, and more preferably 0.10 μm or more, and is preferably 0.25 μm or less, and more preferably 0.20 μm or less. When the volume-average particle diameter $D^p$ of the particulate polymer is not less than any of the lower limits set forth above, cycle characteristics of a functional layer can be enhanced. On the other hand, when the volume-average particle diameter $D^p$ of the particulate polymer is not more than any of the upper limits set forth above, heat shrinkage resistance and adhesiveness of a functional layer can be further improved.

<<Production of Particulate Polymer>>

The particulate polymer is produced through polymerization of a monomer composition that contains the monomers described above.

The proportional content of each monomer in the monomer composition is normally the same as the proportional content of each monomer unit in the target particulate polymer.

The polymerization method of the particulate polymer is not specifically limited and may be any of solution polymerization, suspension polymerization, bulk polymerization, or emulsion polymerization, for example. The polymerization reaction may be, for example, addition polymerization such as ionic polymerization, radical polymerization, or living radical polymerization. Commonly used emulsifiers, dispersants, polymerization initiators, polymerization aids, and the like may be used in the polymerization in an amount that is also the same as commonly used.

In polymerization of the particulate polymer, it is preferable that, at any timing from the start of polymerization to the end of polymerization, the polymerization temperature is lowered below the polymerization temperature at the start of polymerization and that the polymerization is ended. In particular, the polymerization temperature at the point at which polymerization ends is preferably at least 10° C. lower than the temperature at the start of polymerization, and is more preferably at least 15° C. lower than the temperature at the start of polymerization.

<Solvent>

Any known solvent that enables dispersion of the particulate polymer described above can be used as the solvent that can be contained in the presently disclosed binder. In particular, it is preferable that water is used as the solvent. Note that at least some of the solvent that is contained in the binder may be a polymerization solvent that was used in production of the particulate polymer, but is not specifically limited thereto.

<pH of Binder for Functional Layer>

The pH of the binder for a functional layer in a case in which water is adopted as the solvent is preferably 5 or higher, and more preferably 6 or higher, and is preferably 9 or lower, and more preferably 8 or lower. When the pH is within any of the ranges set forth above, preservation stability of the binder for a functional layer can be increased. Note that the pH of a binder for a functional layer can be measured according to a method described in the EXAMPLES section.

<Production of Binder for Non-Aqueous Secondary Battery Functional Layer>

No specific limitations are placed on the method by which the presently disclosed binder is produced. For example, in a case in which production of the particulate polymer is performed in a solvent such as water to obtain the particulate polymer as a dispersion liquid, the dispersion liquid of the particulate polymer may be used as the binder in that form, or other components may optionally be added to the dispersion liquid of the particulate polymer to obtain the binder. Examples of such other components include other components that are subsequently described in the "Slurry composition for secondary battery functional layer" section.

(Slurry Composition for Secondary Battery Functional Layer)

The presently disclosed slurry composition is a composition that is used for an application of functional layer formation, that contains the binder set forth above, a solvent, and functional particles, and that optionally further contains other components. As a result of the presently disclosed slurry composition containing the binder set forth above, it is possible to obtain a functional layer having excellent heat shrinkage resistance and adhesiveness by drying the presently disclosed slurry composition on a substrate, for example.

<Binder>

The presently disclosed binder set forth above that contains at least the particulate polymer is used as the binder.

No specific limitations are placed on the amount of the binder in the slurry composition. For example, in a case in which the slurry composition contains functional particles such as subsequently described non-conductive particles, the amount of the binder in the slurry composition, in terms of solid content, is preferably 1.0 parts by mass or more, and more preferably 1.5 parts by mass or more relative to 100 parts by mass of the functional particles, and is preferably 6 parts by mass or less, and more preferably 4 parts by mass or less relative to 100 parts by mass of the functional particles. When the amount of the binder in the slurry composition is not less than any of the lower limits set forth above, adhesiveness of a functional layer can be further improved. On the other hand, when the amount of the binder in the slurry composition is not more than any of the upper limits set forth above, heat shrinkage resistance of a functional layer can be further improved.

<Functional Particles>

The functional particles for causing a functional layer to display an expected function may be non-conductive particles in a case in which the functional layer is a porous membrane layer, for example.

In particular, a presently disclosed slurry composition that contains non-conductive particles as functional particles can suitably be used in an application of forming a porous membrane layer that improves heat resistance and/or strength of a battery member since a functional layer that is formed using the presently disclosed slurry composition has excellent heat shrinkage resistance.

<<Non-Conductive Particles>>

Specifically, although both inorganic fine particles and organic fine particles can be used without any specific limitations as non-conductive particles that can be used in a porous membrane layer of a secondary battery, inorganic fine particles are typically used. In particular, the material of the non-conductive particles is preferably an electrochemically stable material that is present stably in the environment of use of a secondary battery. Examples of materials of the non-conductive particles that are preferable from the viewpoints set forth above include particles of oxides such as aluminum oxide (alumina), hydrous aluminum oxide (boehmite), silicon oxide, magnesium oxide (magnesia), calcium oxide, titanium oxide (titania), $BaTiO_3$, ZrO, and alumina-silica complex oxide; particles of nitrides such as aluminum nitride and boron nitride; particles of covalently bonded crystals such as silicon and diamond; particles of sparingly soluble ionic crystals such as barium sulfate, calcium fluoride, and barium fluoride; and fine particles of clays such as talc and montmorillonite. These particles may be subjected to element substitution, surface treatment, solid solution treatment, and/or the like as necessary.

The material of the non-conductive particles is preferably alumina, boehmite, or barium sulfate from a viewpoint of inhibiting aggregation and increasing dispersibility of the slurry composition for a functional layer, and is more preferably alumina or barium sulfate.

One of these types of non-conductive particles may be used individually, or two or more of these types of non-conductive particles may be used in combination.

The volume-average particle diameter $D^n$ of the non-conductive particles is preferably 0.1 μm or more, and more preferably 0.3 μm or more, and is preferably 1.5 μm or less, and more preferably 1.0 μm or less. When the volume-average particle diameter $D^n$ of the non-conductive particles is not less than any of the lower limits set forth above, adhesiveness of a functional layer can be further improved. On the other hand, when the volume-average particle diameter $D^n$ of the non-conductive particles is not more than any of the upper limits set forth above, heat shrinkage resistance of a functional layer can be further improved.

A ratio $D^n/D^p$ of the volume-average particle diameter $D^n$ of the non-conductive particles and the volume-average particle diameter $D^p$ of the particulate polymer is preferably not less than 2.0 and not more than 7.0, and more preferably not less than 2.5 and not more than 5.0. When $D^n/D^p$ is not less than any of the lower limits set forth above, adhesiveness of a functional layer can be even further increased. Moreover, when $D^n/D^p$ is not more than any of the upper limits set forth above, heat shrinkage resistance of a functional layer can be even further increased.

<Other Components>

The slurry composition may further contain other components besides the components described above. No specific limitations are placed on these other components so long as they do not have an excessively negative influence on battery reactions in a secondary battery that includes a functional layer. Moreover, one type of other component may be used, or two or more types of other components may be used.

Examples of other components include surfactants, wetting agents, leveling agents, dispersants, electrolyte solution decomposition inhibitors, and water-soluble polymers.

From a viewpoint of further improving heat shrinkage resistance of a functional layer, it is preferable that a water-soluble polymer is used as another component.

Note that when a polymer is said to be "water-soluble" in the present disclosure, this means that when 0.5 g of the polymer is dissolved in 100 g of water at a temperature of 25° C., insoluble content is less than 1 mass %.

Although no specific limitations are placed on the water-soluble polymer, it is preferable to use carboxymethyl cellulose or polyacrylamide from a viewpoint of even further improving heat shrinkage resistance of a functional layer.

No specific limitations are placed on the amount of the water-soluble polymer in the slurry composition. For example, in a case in which the slurry composition contains functional particles such as above described non-conductive particles, the amount of the water-soluble polymer in the slurry composition, in terms of solid content, is preferably 0.2 parts by mass or more, and more preferably 0.4 parts by mass or more relative to 100 parts by mass of the functional particles, and is preferably 3 parts by mass or less, and more preferably 2 parts by mass or less relative to 100 parts by mass of the functional particles. When the amount of the water-soluble polymer in the slurry composition is not less than any of the lower limits set forth above, heat shrinkage resistance of a functional layer can be even further improved. On the other hand, when the amount of the water-soluble polymer in the slurry composition is not more than any of the upper limits set forth above, it is possible to ensure sufficiently high coating stability when the slurry composition is applied onto a substrate to form a functional layer.

Moreover, from a viewpoint of improving stability of the slurry composition, it is preferable that a dispersant is used as another component. The dispersant is not specifically limited and may be sodium polyacrylate or the like, for example. Note that the dispersant is a different component from the previously described water-soluble polymer.

No specific limitations are placed on the amount of the dispersant in the slurry composition. For example, in a case in which the slurry composition contains functional particles such as above described non-conductive particles, the amount of the dispersant in the slurry composition, in terms of solid content, is preferably 0.1 parts by mass or more, and more preferably 0.2 parts by mass or more relative to 100 parts by mass of the functional particles, and is preferably 2 parts by mass or less, and more preferably 1 part by mass or less relative to 100 parts by mass of the functional particles. When the amount of the dispersant in the slurry composition is not less than any of the lower limits set forth above, stability of the slurry composition can be further improved. On the other hand, when the amount of the dispersant is the slurry composition is not more than any of the upper limits set forth above, coatability of the slurry composition can be increased.

Furthermore, from a viewpoint of improving coatability of the slurry composition, it is preferable that a surfactant is used as another component. The surfactant is not specifically limited and may be a polyethylene glycol-type surfactant, for example. Note that the surfactant is a different component from the previously described water-soluble polymer and dispersant.

No specific limitations are placed on the amount of the surfactant in the slurry composition. For example, in a case in which the slurry composition contains functional particles such as above described non-conductive particles, the amount of the surfactant in the slurry composition, in terms of solid content, is preferably 0.05 parts by mass or more, and more preferably 0.1 parts by mass or more relative to 100 parts by mass of the functional particles, and is preferably 0.5 parts by mass or less, and more preferably 0.3 parts by mass or less relative to 100 parts by mass of the functional particles. When the amount of the surfactant in the slurry composition is not less than any of the lower limits set forth above, sufficient coatability of the slurry composition onto a substrate can be ensured. On the other hand, when the amount of the surfactant in the slurry composition is not more than any of the upper limits set forth above, sufficiently high adhesiveness of a functional layer can be ensured.

<Production of Slurry Composition>

No specific limitations are placed on the method by which the slurry composition is produced.

For example, the slurry composition can be produced by mixing the binder, non-conductive particles, and other components that are used as necessary in the presence of a solvent.

Any of the solvents that were previously described in the "Binder for secondary battery functional layer" section (for example, water) can be used as the solvent that is used in production of the slurry composition. Moreover, the solvent that is used in production of the slurry composition includes a solvent that was contained in the binder. The mixing method is not specifically limited, and mixing may be performed using a typically used stirrer or disperser.

(Functional Layer for Secondary Battery)

The presently disclosed functional layer is a layer having a function such as reinforcement or adhesion inside of a secondary battery. For example, the functional layer may be a porous membrane layer that improves heat resistance and/or strength. Moreover, the presently disclosed functional layer is a layer that is formed from the presently disclosed slurry composition set forth above. For example, the presently disclosed functional layer can be formed by applying the slurry composition set forth above onto the surface of a suitable substrate to form a coating film and then drying the coating film that is formed. In other words, the presently disclosed functional layer is formed of a dried product of the slurry composition set forth above, normally contains at least a particulate polymer and functional particles, and optionally further contains other components. Note that since components contained in the functional layer are components that were contained in the slurry composition set forth above, the preferred ratio of these components is also the same as the preferred ratio of the components in the slurry composition.

The presently disclosed functional layer has excellent heat shrinkage resistance and adhesiveness as a result of being formed from the presently disclosed slurry composition that contains the presently disclosed binder.

<Substrate>

No specific limitations are placed on the substrate onto which the slurry composition is applied. For example, a coating film of the slurry composition may be formed on the surface of a releasable substrate, this coating film may be dried to form a functional layer, and then the releasable substrate may be peeled from the functional layer. The functional layer that is peeled from the releasable substrate in this manner can be used as a free-standing film in formation of a battery member of a secondary battery.

However, it is preferable that a separator substrate or an electrode substrate is used as the substrate from a viewpoint of raising battery member production efficiency since a step of peeling the functional layer can be omitted. Specifically, it is preferable that the functional layer is formed by applying the slurry composition onto a separator substrate or an electrode substrate.

The surface of a substrate such as a separator substrate or an electrode substrate may be subjected to surface treatment such as corona treatment or plasma treatment and may be hydrophilized from a viewpoint of increasing adhesiveness between the substrate and the formed functional layer.

<<Separator Substrate>>

The separator substrate is not specifically limited and may be a known separator substrate such as an organic separator substrate. The organic separator substrate is a porous member that is formed of an organic material. The organic separator substrate may, for example, be a microporous membrane or non-woven fabric containing a polyolefin resin such as polyethylene or polypropylene, an aromatic polyamide resin, or the like, and is preferably a microporous membrane or non-woven fabric made of polyethylene due to the excellent strength thereof.

<<Electrode Substrate>>

The electrode substrate (positive electrode substrate or negative electrode substrate) is not specifically limited and may be an electrode substrate obtained by forming an electrode mixed material layer containing electrode active material particles and a binding material on a current collector.

The current collector is a material having electrical conductivity and electrochemical durability. Specifically, the current collector may, for example, be made of iron, copper, aluminum, nickel, stainless steel, titanium, tantalum, gold, platinum, or the like. Of these materials, copper foil is particularly preferable as a current collector used for a negative electrode. On the other hand, aluminum foil is particularly preferable as a current collector used for a positive electrode. One of these materials may be used individually, or two or more of these materials may be used in combination in a freely selected ratio.

Any known electrode active material particles can be used without any specific limitations as the electrode active material particles that are contained in the electrode mixed material layer of the electrode substrate. Moreover, any binding material that is used for an electrode mixed material layer can be used as the binding material that is contained in the electrode mixed material layer of the electrode substrate.

<Formation Method of Functional Layer>

Examples of methods by which the functional layer may be formed on a substrate such as the separator substrate or the electrode substrate described above include:

(1) a method in which the presently disclosed slurry composition is applied onto the surface of the substrate (surface at the electrode mixed material layer-side in the case of an electrode substrate; same applies below) and is then dried;

(2) a method in which the substrate is immersed in the presently disclosed slurry composition and is then dried; and (3) a method in which the presently disclosed slurry composition is applied onto a releasable substrate and is dried to produce a functional layer that is then transferred onto the surface of the substrate.

Of these methods, method (1) is particularly preferable since it allows simple control of the thickness of the functional layer. In more detail, method (1) includes a step of applying the slurry composition onto the substrate (application step) and a step of drying the slurry composition that has been applied onto the substrate to form a functional layer (drying step).

<<Application Step>>

Examples of methods by which the slurry composition can be applied onto the substrate in the application step include, but are not specifically limited to, doctor blading, reverse roll coating, direct roll coating, gravure coating, extrusion coating, and brush coating.

<<Drying Step>>

Any commonly known method can be adopted without any specific limitations as the method by which the slurry composition on the substrate is dried in the drying step. Examples of drying methods that may be used include drying by warm, hot, or low-humidity air, drying in a vacuum, and drying through irradiation with infrared light, electron beams, or the like. Although no specific limitations are placed on the drying conditions, the drying temperature is preferably 40° C. to 150° C., and the drying time is preferably 2 minutes to 30 minutes.

The thickness of the functional layer that is formed is preferably 0.5 μm or more, and more preferably 1 μm or more, and is preferably 4 μm or less, and more preferably 3 μm or less. When the thickness of the functional layer is not less than any of the lower limits set forth above, sufficiently high heat shrinkage resistance of the functional layer can be ensured. On the other hand, when the thickness of the functional layer is not more than any of the upper limits set forth above, internal resistance of a secondary battery can be reduced through reduction of thickness of the functional layer.

(Battery Member Including Functional Layer)

A battery member (separator or electrode) that includes the presently disclosed functional layer may include constituent elements other than the presently disclosed functional layer and the substrate described above so long as the effects according to the present disclosure are not significantly lost. Examples of such constituent elements include, but are not specifically limited to, porous membrane layers, adhesive layers, and so forth that do not correspond to the presently disclosed functional layer.

Moreover, the battery member may include a plurality of types of the presently disclosed functional layer. For example, a separator may include a porous membrane layer formed from a presently disclosed slurry composition for a porous membrane layer on a separator substrate and may also include an adhesive layer formed from a presently disclosed slurry composition for an adhesive layer on the porous membrane layer.

A battery member that includes the presently disclosed functional layer has excellent heat shrinkage resistance and adhesiveness and can adhere well to an adjacent battery member.

(Secondary Battery)

The presently disclosed secondary battery is a secondary battery that includes the presently disclosed functional layer set forth above. More specifically, the presently disclosed secondary battery includes a positive electrode, a negative electrode, a separator, and an electrolyte solution, wherein the functional layer for a secondary battery set forth above is included in at least one battery member among the positive electrode, the negative electrode, and the separator.

Note that the presently disclosed secondary battery has excellent cycle characteristics at high temperature as a result of including the presently disclosed functional layer.

<Positive Electrode, Negative Electrode, and Separator>

At least one among the positive electrode, the negative electrode, and the separator that are used in the presently disclosed secondary battery is a battery member that includes the presently disclosed functional layer set forth above. Note that for a positive electrode, negative electrode, or separator that does not include the presently disclosed functional layer, a known positive electrode, negative electrode, or separator can be used without any specific limitations.

<Electrolyte Solution>

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that may be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)_2NLi$. Of these lithium salts, $LiPF_6$, $LiClO_4$, and $CF_3SO_3Li$ are preferable as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of organic solvents that can suitably be used in a lithium ion secondary battery, for example, include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

<Production Method of Secondary Battery>

The presently disclosed secondary battery set forth above can be produced by, for example, stacking the positive electrode and the negative electrode with the separator in-between, performing rolling, folding, or the like of the resultant laminate, as necessary, to place the laminate in a battery container, injecting the electrolyte solution into the battery container, and sealing the battery container. At least one member among the positive electrode, the negative electrode, and the separator is a battery member that includes the presently disclosed functional layer. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may, for example, be a coin type, a button type, a sheet type, a cylinder type, a prismatic type, or a flat type.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion constituted by a repeating unit (monomer unit) that is formed through polymerization of a given monomer in the polymer is normally, unless otherwise specified, the same as the ratio (charging ratio) of the given monomer among all monomers used in polymerization of the polymer.

Measurements and evaluations of various attributes in the examples and comparative examples were performed according to the following methods.

<Light Absorbance Ratio of Particulate Polymer>

A particulate polymer produced in each example or comparative example was dried at room temperature and was then shaped into a film of approximately 0.1 mm in thickness. Next, a Fourier-transform infrared spectrometer (Nicolet iS10 produced by Thermo Fisher Scientific) was used to perform measurement by ATR (Attenuated Total Reflection) using a Ge crystal to obtain an infrared absorption spectrum. Measurement of the infrared absorption spectrum was performed at room temperature (20° C.) while performing ventilation with nitrogen as an inert gas. A maximum value A1 of light absorbance in a wavenumber range of 880 $cm^{-1}$ to 930 $cm^{-1}$ and a maximum value A2 of light absorbance in a wavenumber range of 2210 $cm^{-1}$ to 2270 $cm^{-1}$ were read from the obtained infrared absorption spectrum, and a light absorbance ratio A1/A2 was calculated according to the following formula. Note that in a case in which the intensity at the edge of an interval corresponded to the maximum value in a specific wavenumber interval, a value at the center of that interval was taken to be the "maximum value".

Light absorbance ratio=Maximum light absorbance value (880 $cm^{-1}$ to 930 $cm^{-1}$) A1÷Maximum light absorbance value (2210 $cm^{-1}$ to 2270 $cm^{-1}$) A2

<Volume-Average Particle Diameter $D^p$ of Particulate Polymer>

The volume-average particle diameter $D^p$ of a particulate polymer was measured by laser diffraction. Specifically, a produced water dispersion containing the particulate polymer (adjusted to a solid content concentration of 0.1 mass %) was used as a sample. In a particle diameter distribution (by volume) measured using a laser diffraction particle size analyzer (produced by Beckman Coulter, Inc.; product name: LS-13 320), the particle diameter D50 at which cumulative volume calculated from a small diameter end of the distribution reached 50% was taken to be the volume-average particle diameter $D^p$.

<Volume-Average Particle Diameter $D^n$ of Non-Conductive Particles>

In measurement of the particle diameter of non-conductive particles, the non-conductive particles were mixed with 0.2 mass % sodium hexametaphosphate aqueous solution such as to have a concentration of 1% and were dispersed through 3 minutes of ultrasonication to produce a slurry as a sample. With regards to the obtained sample, the dispersed slurry was added dropwise into a flow cell supplied with deionized water such that the scattering intensity was approximately 50% and was measured using a laser diffraction particle size analyzer (SALD-7100 produced by Shimadzu Corporation) in order to determine the particle diameter D50 at which cumulative volume calculated from the small diameter end reached 50% as the volume-average particle diameter $D^n$.

<Glass-Transition Temperature of Particulate Polymer>

A dispersion liquid containing a particulate polymer produced in each example or comparative example was subjected to 3 days of preliminary drying in an environment having a humidity of 50% and a temperature of 23° C. to 26° C. and was subjected to preliminary film formation with a thickness of 2±0.5 mm. The film resulting from preliminary film formation was dried in a vacuum dryer at a temperature of 120° C. for 10 hours. Thereafter, the dried film was adopted as a sample to measure the glass-transition temperature (° C.) in accordance with JIS K7121 under conditions of a measurement temperature of −100° C. to 180° C. and a heating rate of 5° C./min using a differential scanning calorimeter (DSC7200 produced by SII).

<Measurement of Storage Modulus of Elasticity of Particulate Polymer>

A particulate polymer obtained in each example or comparative example was dried at room temperature and was then shaped into a film of approximately 0.1 mm in thickness. The film was punched out as a circle of 8 mm in diameter to obtain a sample. Using the apparatus indicated below, a specific temperature was set, and then strain with a frequency of 1 Hz was applied to the sample, and dynamic viscoelasticity thereof was measured. The storage modulus of elasticity was then determined based on this measurement result.

Apparatus: MCR 301 (product name) produced by Anton Paar GmbH

Set temperature: 50° C.

Measurement frequency: 1 Hz

<Measurement of pH of Binder for Functional Layer>

The pH of a binder composition obtained in each example or comparative example was measured at 25° C. using a pH Meter F-21 produced by Horiba, Ltd. after performing calibration of a glass electrode with pH 4, pH 7, and pH 9 buffer solutions.

<Preservation Stability of Binder for Functional Layer>

A particulate polymer produced in each example or comparative example was divided into two small portions of 20 mL each, these portions were then separately left at rest for 90 days in constant temperature tanks of 5° C. and 45° C., respectively, and then each portion was shaped into a film of approximately 0.1 mm in thickness. Next, a Fourier-transform infrared spectrometer (Nicolet iS10 produced by Thermo Fisher Scientific) was used to perform measurement by ATR using a Ge crystal to obtain an absorption spectrum. Measurement was performed at room temperature (20° C.) while performing ventilation with nitrogen as an inert gas. The samples for 5° C. and 45° C. were compared, and the rate of reduction of a maximum value of light absorbance at from 880 $cm^{-1}$ to 930 $cm^{-1}$ was calculated.

A: Rate of reduction of less than 20%

B: Rate of reduction of not less than 20% and less than 30%

C: Rate of reduction of 30% or more

<Adhesiveness of Secondary Battery Functional Layer>

A functional layer-equipped separator produced in each example or comparative example was cut out as 10 mm in width by 50 mm in length to obtain a test specimen. Next, a stainless steel plate having double-sided tape (No. 5608 produced by Nitto Denko Corporation) affixed thereto was prepared, and the surface of the functional layer of the test specimen was affixed to the double-sided tape. One end of the separator substrate was pulled and peeled off at a speed of 50 mm/min such that the peeling surface was at 180°, and the strength during this peeling was measured.

A: Peel strength of 15 N/m or more

B: Peel strength of not less than 5 N/m and less than 15 N/m

C: Peel strength of less than 5 N/m

<Heat Shrinkage Resistance Secondary Battery Functional Layer>

A functional layer-equipped separator produced in each example or comparative example was cut out as a square of 12 cm in width by 12 cm in length, and then a square having a side length of 10 cm was drawn in an inner part of the cut-out square to obtain a test specimen. The test specimen was placed in a 150° C. constant temperature tank and was left therein for 1 hour. Thereafter, the area change of the square drawn in the inner part was calculated (area change={(area of square before being left−area of square after being left)/area of square before being left}×100%) as a heat shrinkage rate and was evaluated by the following standard. A smaller heat shrinkage rate indicates that the functional layer has better heat shrinkage resistance.

A: Heat shrinkage rate of less than 10%

B: Heat shrinkage rate of not less than 10% and less than 20%

C: Heat shrinkage rate of 20% or more

<Cycle Characteristics at High Temperature of Secondary Battery>

A lithium ion secondary battery produced in each example or comparative example was left at rest in a 25° C. environment for 24 hours. The lithium ion secondary battery was subsequently subjected to a charge/discharge operation of charging to 4.2 V by a constant-voltage constant-current (CC-CV) method (cut off condition: 0.02 C) with a charge rate of 1 C and discharging to 3.0 V by a constant-current (CC) method with a discharge rate of 1 C at 25° C., and the initial capacity C0 was measured.

The lithium ion secondary battery was also repeatedly subjected to the same charge/discharge operation in a 45° C. environment, and the capacity C1 after 300 cycles was measured. A capacity maintenance rate AC was calculated (ΔC=(C1/C0)×100(%)) and was evaluated by the following standard. A higher value for the capacity maintenance rate indicates less reduction of discharge capacity and better cycle characteristics.

A: Capacity maintenance rate AC of 85% or more

B: Capacity maintenance rate AC of not less than 77% and less than 85%

C: Capacity maintenance rate AC of less than 77%

Example 1

<Production of Binder for Functional Layer>

A reactor including a stirrer was supplied with 90 parts of deionized water, 0.05 parts of sodium dodecylbenzenesulfonate (NEOPELEX G-15 produced by Kao Corporation) as an emulsifier, and 0.23 parts of ammonium persulfate, the gas phase was purged with nitrogen gas, and the temperature was raised to 70° C.

Meanwhile, a monomer composition was obtained in a separate vessel by mixing 50 parts of deionized water, 0.2 parts of sodium dodecylbenzenesulfonate (NEOPELEX G-15 produced by Kao Corporation) as an emulsifier, 80 parts of butyl acrylate (BA) as a (meth)acrylic acid ester monomer, 10 parts of acrylonitrile (AN) as a cyano group-containing monomer, and 10 parts of allyl glycidyl ether (AGE) as a cyclic ether-containing monomer. The monomer composition was continuously added into the reactor over 3 hours to perform polymerization. The reaction was carried out at 70° C. during the addition. Once the addition was complete, the temperature was lowered to 50° C., 0.2 parts of t-butyl peroxy-2-ethylhexanoate (produced by NOF Corporation; product name: PERBUTYL O) was added as a polymerization initiator, 0.1 parts of ascorbic acid was added as a reductant, 3 hours of stirring was performed, and then the reaction was ended to produce a water dispersion (binder for a functional layer) containing a particulate polymer. The obtained binder for a functional layer was set to pH 7 through pH adjustment using 10% ammonia water. Measurements and evaluations of various attributes were performed with respect to the obtained functional layer binder. The results are shown in Table 1.

<Production of Slurry Composition for Functional Layer>

Alumina particles (AKP-3000 produced by Sumitomo Chemical Co., Ltd.; volume-average particle diameter D″=0.7 μm) were used as non-conductive particles, a sodium salt of an acrylic-sulfonic acid monomer copolymer (produced by Nippon Shokubai Co., Ltd.; product name: Aqualic GL366) was used as a dispersant, and carboxymethyl cellulose having a degree of etherification of 0.8 to 1.0 (produced by Daicel FineChem Ltd.; product name: 1220) was used as a viscosity modifier. Note that the viscosity of a 1% aqueous solution of the viscosity modifier was 10 mPa-s to 20 mPa-s.

A dispersion liquid was obtained by mixing 100 parts of the non-conductive particles, 0.5 parts of the dispersant, and deionized water and then processing these materials for 1 hour in a bead mill (LMZ015 produced by Ashizawa Finetech Ltd.). In addition, the binder for a functional layer obtained as described above in an amount such as to be 3 parts in terms of solid content, a 4% aqueous solution of carboxymethyl cellulose in an amount such as to be 1.5 parts in terms of solid content, and 0.2 parts of a polyethylene glycol-type surfactant (NOPTECHS ED-052 produced by San Nopco Limited) were mixed so as to produce a slurry composition for a functional layer having a solid content concentration of 40 mass %.

<Production of Separator Including Functional Layer at One Side>

A separator substrate made of polyethylene (produced by Asahi Kasei Corporation; product name: ND412; thickness: 12 μm) was prepared. The slurry for a functional layer produced as described above was applied onto the surface of the prepared separator substrate and was dried at a temperature of 50° C. for 3 minutes to obtain a separator including a functional layer at one side (functional layer thickness: 3 μm). Adhesiveness and heat shrinkage resistance were evaluated for the obtained functional layer-equipped separator. The results are shown in Table 1.

<Production of Negative Electrode>

A 5 MPa pressure-resistant vessel equipped with a stirrer was charged with 33 parts of 1,3-butadiene as an aliphatic conjugated diene monomer, 3.5 parts of itaconic acid as a carboxy group-containing monomer, 63.5 parts of styrene as an aromatic vinyl monomer, 0.4 parts of sodium dodecylbenzenesulfonate as an emulsifier, 150 parts of deionized water, and 0.5 parts of potassium persulfate as a polymerization initiator. These materials were thoroughly stirred and were then heated to 50° C. to initiate polymerization. At the point at which the polymerization conversion rate reached 96%, cooling was performed to quench the polymerization reaction to yield a mixture containing a particulate binder (styrene-butadiene copolymer). The mixture was adjusted to pH 8 through addition of 5% sodium hydroxide aqueous solution and was then subjected to thermal-vacuum distillation to remove unreacted monomer. Thereafter, the mixture was cooled to 30° C. or lower to obtain a water dispersion containing a binding material for a negative electrode.

A planetary mixer was charged with 48.75 parts of artificial graphite (theoretical capacity: 360 mAh/g) and 48.75 parts of natural graphite (theoretical capacity: 360 mAh/g) as negative electrode active materials and 1 part in terms of solid content of carboxymethyl cellulose as a thickener. These materials were diluted to a solid content concentration of 60% with deionized water and were then kneaded at a rotation speed of 45 rpm for 60 minutes. Thereafter, 1.5 parts in terms of solid content of the styrene-butadiene copolymer obtained as described above was added and was kneaded therewith at a rotation speed of 40 rpm for 40 minutes. Moreover, the viscosity was adjusted to 3,000±500 mPa-s (measured by B-type viscometer at 25° C. and 60 rpm) through addition of deionized water to produce a slurry composition for a negative electrode mixed material layer.

The slurry composition for a negative electrode mixed material layer was applied onto the surface of copper foil of 15 μm in thickness serving as a current collector by a comma coater such as to have a coating weight of 11±0.5 mg/cm$^2$. The copper foil with the slurry composition for a negative electrode mixed material layer applied thereon was subsequently conveyed inside an oven having a temperature of 80° C. for 2 minutes and an oven having a temperature of 110° C. for 2 minutes at a speed of 400 mm/min so as to dry the slurry composition on the copper foil and thereby obtain a negative electrode web having a negative electrode mixed material layer formed on the current collector.

Thereafter, the negative electrode mixed material layer-side of the produced negative electrode web was roll pressed under conditions of a line pressure of 11 t (tons) and an environment having a temperature of 25±3 C to obtain a negative electrode having a negative electrode mixed material layer density of 1.60 g/cm$^3$. This negative electrode was subsequently left in an environment having a temperature of 25±3 C and a relative humidity of 50±5% for 1 week.

<Production of Positive Electrode>

A slurry composition for a positive electrode mixed material layer was produced by adding 96 parts of an active material NMC111 based on a lithium complex oxide of Co—Ni—Mn ($LiNi_{1/3}Co_{1/3}Mn_{1/3}O_2$) as a positive electrode active material, 2 parts of acetylene black (produced by Denka Company Limited; product name: HS-100) as a conductive material, and 2 parts of polyvinylidene fluoride (produced by Kureha Corporation; product name: KF-1100) as a binding material into a planetary mixer, further adding N-methyl-2-pyrrolidone (NMP) as a dispersion medium such that the total solid content concentration was 67%, and mixing these materials. Next, the obtained slurry composition for a positive electrode mixed material layer was applied onto aluminum foil of 20 μm in thickness serving as a current collector by a comma coater such as to have a coating weight of 20±0.5 mg/cm$^2$. The aluminum foil was conveyed inside an oven having a temperature of 90° C. for 2 minutes and an oven having a temperature of 120° C. for 2 minutes at a speed of 200 mm/min so as to dry the slurry composition on the aluminum foil and thereby obtain a positive electrode web having a positive electrode mixed material layer formed on the current collector. Thereafter, the positive electrode mixed material layer-side of the produced positive electrode web was roll pressed under conditions of a line pressure of 14 t (tons) and an environment having a temperature of 25±3 C to obtain a positive electrode having a positive electrode mixed material layer density of 3.40 g/cm$^3$. This positive electrode was subsequently left in an environment having a temperature of 25±3° C. and a relative humidity of 50±5% for 1 week.

<Production of Secondary Battery>

The post-pressing positive electrode obtained as described above was cut out as a 4 cm×4 cm square, and the post-pressing negative electrode was cut out as 4.2 cm×4.2 cm. In addition, the functional layer-equipped separator including a functional layer that was obtained as described above was cut out as 5 cm×5 cm. Next, the cut-out functional layer-equipped separator was arranged on the positive electrode mixed material layer of the cut-out post-pressing positive electrode with the functional layer coated surface thereof facing toward the positive electrode mixed material layer. Moreover, the cut-out post-pressing negative electrode mixed material layer was arranged facing a surface of the arranged functional layer-equipped separator that was not in contact with the positive electrode so as to obtain a battery member laminate (positive electrode/functional layer/separator substrate/negative electrode). Next, the obtained laminate was enclosed in an aluminum packing case serving as a battery case, and an electrolyte solution (solvent: ethylene carbonate (EC)/diethyl carbonate (DEC)/vinylene carbonate (VC) (volume ratio=68.5/30/1.5); electrolyte: $LiPF_6$ of 1 mol/L in concentration) was injected such that no air remained. An opening of the aluminum packing case was heat sealed at a temperature of 150° C. to tightly close the aluminum packing case and thereby produce a 40-mAh stacked lithium ion secondary battery. This lithium ion secondary battery was used to evaluate cycle characteristics at high temperature.

Examples 2 to 5 and 8

In production of the binder for a functional layer, the used cyclic ether-containing monomer was changed to glycidyl methacrylate (GMA) and the mixing proportions of various monomers were changed as indicated in Table 1. With the exception of these points, operations, measurements, and evaluations were performed in the same way as in Example 1. The results are shown in Table 1.

Example 6

Operations, measurements, and evaluations were performed in the same way as in Example 1 with the exception that adjustment was performed to pH 9 in production of the binder for a functional layer. The results are shown in Table 1.

Example 7

Operations, measurements, and evaluations were performed in the same way as in Example 1 with the exception that pH adjustment was not performed in production of the binder for a functional layer and that the pre-adjustment pH (pH 5) was maintained. The results are shown in Table 1.

Example 9

Operations, measurements, and evaluations were performed in the same way as in Example 1 with the exception that the mixing proportions of various monomers were changed as indicated in Table 1 in production of the binder for a functional layer. The results are shown in Table 1.

Example 10

Operations, measurements, and evaluations were performed in the same way as in Example 1 with the exception that the amount of the emulsifier that was charged to the reactor in advance in production of the binder for a functional layer was set as 0 parts (i.e., the emulsifier was not charged to the reactor in advance). The results are shown in Table 1.

Example 11

Operations, measurements, and evaluations were performed in the same way as in Example 1 with the exception that the amount of the emulsifier that was charged to the reactor in advance in production of the binder for a functional layer was set as 0.1 parts. The results are shown in Table 1.

Example 12

Operations, measurements, and evaluations were performed in the same way as in Example 1 with the exception that the used (meth)acrylic acid ester monomer was changed to 2-ethylhexyl acrylate (2EHA) in production of the binder for a functional layer. The results are shown in Table 1.

Example 13

Operations, measurements, and evaluations were performed in the same way as in Example 1 with the exception that boehmite (APYRAL AOH60 produced by Nabaltec; volume-average particle diameter $D^n$=0.9 μm) was used as inorganic particles in production of the slurry composition for a functional layer. The results are shown in Table 1.

Example 14

Operations, measurements, and evaluations were performed in the same way as in Example 1 with the exception that barium sulfate (TS-3 produced by Takehara Kagaku Kogyo Co., Ltd.; volume-average particle diameter $D^n$=0.6 μm) was used as inorganic particles in production of the slurry for a functional layer. The results are shown in Table 1.

Example 15

Operations, measurements, and evaluations were performed in the same way as in Example 1 with the exception that an anionic polyacrylamide (Polystron 117 produced by Arakawa Chemical Industries, Ltd.) was used as a viscosity modifier in production of the slurry for a functional layer. The results are shown in Table 1.

Comparative Example 1

Operations, measurements, and evaluations were performed in the same way as in Example 1 with the exception that the mixing proportions of various monomers were changed as indicated in Table 1 in production of the binder for a functional layer. The results are shown in Table 1.

Comparative Example 2

Operations, measurements, and evaluations were performed in the same way as in Example 1 with the exception that a binder for a functional layer produced as described below was used. The results are shown in Table 1.

<Production of Binder for Functional Layer>

A reactor including a stirrer was supplied with 70 parts of deionized water, 0.05 parts of sodium dodecylbenzenesulfonate (NEOPELEX G-15 produced by Kao Corporation) as an emulsifier, and 0.23 parts of ammonium persulfate, the gas phase was purged with nitrogen gas, and the temperature was raised to 70° C.

Meanwhile, a monomer composition was obtained in a separate vessel by mixing 50 parts of deionized water, 0.2 parts of sodium dodecylbenzenesulfonate (NEOPELEX G-15 produced by Kao Corporation) as an emulsifier, 75 parts of 2-ethylhexyl acrylate, 17 parts of acrylonitrile, and 8 parts of glycidyl methacrylate. The monomer composition was continuously added into the reactor over 3 hours to perform polymerization. The reaction was carried out at 70° C. during the addition. Once the addition was complete, steam was introduced into the reactor to remove unreacted monomer. After cooling, the resultant functional layer binder was adjusted to pH 7 through addition of ammonia water. Measurements and evaluations of various attributes were performed with respect to the obtained functional layer binder. The results are shown in Table 1.

In Table 1, shown below:

"BA" indicates butyl acrylate;

"2EHA" indicates 2-ethylhexyl acrylate;

"AN" indicates acrylonitrile;

"AGE" indicates allyl glycidyl ether;

"GMA" indicates glycidyl methacrylate;

"CMC" indicates carboxymethyl cellulose; and

"PAA" indicates polyacrylamide.

TABLE 1

| | | | | | Example 1 | Example 2 | Example 3 | Example 4 | Example 5 | Example 6 | Example 7 | Example 8 | Example 9 |
|---|---|---|---|---|---|---|---|---|---|---|---|---|---|
| Binder for functional layer | Particulate polymer | Monomer composition | (Meth)acrylic acid ester monomer | Type | BA | BA | BA | BA | BA | BA | BA | BA | BA |
| | | | | Amount (parts) | 80 | 80 | 70 | 60 | 90 | 80 | 80 | 50 | 91 |
| | | | Cyano group-containing monomer | Type | AN | AN | AN | AN | AN | AN | AN | AN | AN |
| | | | | Amount (parts) | 10 | 10 | 10 | 10 | 5 | 10 | 10 | 20 | 4 |
| | | | Cyclic ether-containing monomer | Type | AGE | GMA | GMA | GMA | GMA | AGE | AGE | GMA | AGE |
| | | | | Amount (parts) | 10 | 10 | 20 | 30 | 5 | 10 | 10 | 30 | 5 |
| | | Volume-average particle diameter $D^p$ (μm) | | | 0.15 | 0.15 | 0.15 | 0.15 | 0.15 | 0.15 | 0.15 | 0.15 | 0.15 |
| | | Glass-transition temperature (° C.) | | | −19 | −17 | −10 | −2 | −28 | −19 | −19 | 5 | −30 |
| | | IR absorbance ratio (—) | | | 6 | 6 | 12 | 16 | 6 | 6 | 6 | 15 | 7 |
| | | Modulus of elasticity ($10^5$ Pa) | | | 3.7 | 4.0 | 4.5 | 12 | 1.4 | 3.7 | 3.7 | 20 | 1.2 |
| | | Amount (parts by mass) | | | 3 | 3 | 3 | 3 | 3 | 3 | 3 | 3 | 3 |
| | | pH | | | 7 | 7 | 7 | 7 | 7 | 9 | 5 | 7 | 7 |
| Non-conductive particles | Type | | | | Alumina | Alumina | Alumina | Alumina | Alumina | Alumina | Alumina | Alumina | Alumina |
| | Volume-average particle diameter $D^n$ (μm) | | | | 0.5 | 0.5 | 0.5 | 0.5 | 0.5 | 0.5 | 0.5 | 0.5 | 0.5 |
| | Particle diameter ratio $D^n/D^p$ with particulate polymer (—) | | | | 3.3 | 3.3 | 3.3 | 3.3 | 3.3 | 3.3 | 3.3 | 3.3 | 3.3 |
| | Amount (parts by mass) | | | | 100 | 100 | 100 | 100 | 100 | 100 | 100 | 100 | 100 |
| Dispersant | Amount (parts by mass) | | | | 0.5 | 0.5 | 0.5 | 0.5 | 0.5 | 0.5 | 0.5 | 0.5 | 0.5 |
| Water-soluble polymer | Type | | | | CMC | CMC | CMC | CMC | CMC | CMC | CMC | CMC | CMC |
| | Amount (parts by mass) | | | | 1.5 | 1.5 | 1.5 | 1.5 | 1.5 | 1.5 | 1.5 | 1.5 | 1.5 |
| Surfactant | Amount (parts by mass) | | | | 0.3 | 0.2 | 0.2 | 0.2 | 0.2 | 0.2 | 0.2 | 0.2 | 0.2 |
| Functional layer | Coating thickness (μm) | | | | 2 | 2 | 2 | 2 | 2 | 2 | 2 | 2 | 2 |
| Evaluation | Preservation stability of binder for functional layer | | | | A | A | A | A | A | B | B | A | A |
| | Adhesiveness of functional layer | | | | A | A | A | B | B | A | A | B | B |
| | Heat shrinkage resistance of functional layer | | | | A | A | A | A | B | A | A | B | B |
| | High-temperature cycle characteristics of secondary battery | | | | A | A | A | B | A | A | A | A | A |

| | | | | | Example 10 | Example 11 | Example 12 | Example 13 | Example 14 | Example 15 | Comparative Example 1 | Comparative Example 2 |
|---|---|---|---|---|---|---|---|---|---|---|---|---|
| Binder for functional layer | Particulate polymer | Monomer composition | (Meth)acrylic acid ester monomer | Type | BA | BA | 2EHA | BA | BA | BA | BA | 2EHA |
| | | | | Amount (parts) | 80 | 80 | 80 | 80 | 80 | 80 | 83 | 75 |
| | | | Cyano group-containing monomer | Type | AN | AN | AN | AN | AN | AN | AN | AN |
| | | | | Amount (parts) | 10 | 10 | 10 | 10 | 10 | 10 | 15 | 17 |
| | | | Cyclic ether-containing monomer | Type | GMA | GMA | AGE | AGE | AGE | AGE | AGE | GMA |
| | | | | Amount (parts) | 10 | 10 | 10 | 10 | 10 | 10 | 2 | 8 |

TABLE 1-continued

| | | | | | | | | | |
|---|---|---|---|---|---|---|---|---|---|
| | Volume-average particle diameter $D^p$ (μm) | 0.25 | 0.09 | 0.15 | 0.15 | 0.15 | 0.15 | 0.15 | 0.15 |
| | Glass-transition temperature (° C.) | −9 | −9 | −27 | −19 | −19 | −19 | −17 | −8 |
| | IR absorbance ratio (—) | 6 | 6 | 6 | 6 | 6 | 6 | 3 | 3 |
| | Modulus of elasticity ($10^5$ Pa) | 3.8 | 3.6 | 4.0 | 3.7 | 3.7 | 3.7 | 2.3 | 4.1 |
| | Amount (parts by mass) | 3 | 3 | 3 | 3 | 3 | 3 | 3 | 3 |
| | pH | 7 | 7 | 7 | 7 | 7 | 7 | 7 | 7 |
| Non-conductive particles | Type | Alumina | Alumina | Alumina | Boehmite | Barium sulfate | Alumina | Alumina | Alumina |
| | Volume-average particle diameter $D^n$ (μm) | 0.5 | 0.5 | 0.5 | 0.9 | 0.6 | 0.5 | 0.5 | 0.5 |
| | Particle diameter ratio $D^n/D^p$ with particulate polymer (—) | 2.0 | 5.6 | 3.3 | 6.0 | 4.0 | 3.3 | 3.3 | 3.3 |
| | Amount (parts by mass) | 100 | 100 | 100 | 100 | 100 | 100 | 100 | 100 |
| Dispersant | Amount (parts by mass) | 0.5 | 0.5 | 0.5 | 0.5 | 0.5 | 0.5 | 0.5 | 0.5 |
| Water-soluble polymer | Type | CMC | CMC | CMC | CMC | CMC | PAA | CMC | CMC |
| | Amount (parts by mass) | 1.5 | 1.5 | 1.5 | 1.5 | 1.5 | 1.5 | 1.5 | 1.5 |
| Surfactant | Amount (parts by mass) | 0.2 | 0.2 | 0.2 | 0.2 | 0.2 | 0.2 | 0.2 | 0.2 |
| Functional layer | Coating thickness (μm) | 2 | 2 | 2 | 2 | 2 | 2 | 2 | 2 |
| Evaluation | Preservation stability of binder for functional layer | A | A | A | A | A | A | A | C |
| | Adhesiveness of functional layer | B | A | A | A | A | A | C | C |
| | Heat shrinkage resistance of functional layer | B | B | A | B | A | A | C | B |
| | High-temperature cycle characteristics of secondary battery | A | B | A | A | A | A | C | B |

It can be seen from Table 1 that it was possible to form a functional layer having excellent heat shrinkage resistance and adhesiveness using the binders of Examples 1 to 15, which each contained a particulate polymer that included a cyano group-containing monomer unit and a cyclic ether-containing monomer unit and that satisfied a specific infrared absorption spectrum characteristic.

In contrast, it can be seen that heat shrinkage resistance and adhesiveness of a formed functional layer could not be increased in a good balance when using the binders of Comparative Examples 1 and 2, which each contained a particulate polymer that did not satisfy the specific infrared absorption spectrum characteristic.

INDUSTRIAL APPLICABILITY

According to the present disclosure, it is possible to provide a binder for a secondary battery functional layer that is capable of forming a functional layer having excellent heat shrinkage resistance and adhesiveness.

Moreover, according to the present disclosure, it is possible to provide a slurry composition for a secondary battery functional layer that is capable of forming a functional layer having excellent heat shrinkage resistance and adhesiveness.

Furthermore, according to the present disclosure, it is possible to provide a functional layer for a secondary battery having excellent heat shrinkage resistance and adhesiveness.

Also, according to the present disclosure, it is possible to provide a secondary battery including this functional layer.

The invention claimed is:

1. A binder for a secondary battery functional layer comprising a particulate polymer, wherein the particulate polymer includes a cyano group-containing monomer unit and a cyclic ether-containing monomer unit, and in an infrared absorption spectrum of the particulate polymer, a light absorbance ratio A1/A2 of a maximum value A1 of light absorbance in a range of not less than 880 $cm^{-1}$ and not more than 930 $cm^{-1}$ and a maximum value A2 of light absorbance in a range of not less than 2210 $cm^{-1}$ and not more than 2270 $cm^{-1}$ is 5 or more.

2. The binder for a secondary battery functional layer according to claim 1, wherein the light absorbance ratio A1/A2 is 20 or less.

3. The binder for a secondary battery functional layer according to claim 1, further comprising water and having a pH of not lower than 5 and not higher than 9.

4. The binder for a secondary battery functional layer according to claim 1, wherein the particulate polymer has a glass-transition temperature of 20° C. or lower.

5. The binder for a secondary battery functional layer according to claim 1, wherein the particulate polymer has a storage modulus of elasticity at 50° C. of $2\times10^6$ Pa or less.

6. The binder for a secondary battery functional layer according to claim 1, wherein the particulate polymer has a volume-average particle diameter $D^p$ of not less than 0.05 μm and not more than 0.25 μm.

7. A slurry composition for a secondary battery functional layer comprising: the binder for a secondary battery functional layer according claim 1; a solvent; and functional particles.

8. The slurry composition for a secondary battery functional layer according to claim 7, wherein the functional particles include non-conductive particles.

9. The slurry composition for a secondary battery functional layer according to claim 8, wherein a ratio $D^n/D^p$ of a volume-average particle diameter $D^n$ of the non-conductive particles and a volume-average particle diameter $D^p$ of the particulate polymer is not less than 2.0 and not more than 7.0.

10. A functional layer for a secondary battery formed using the slurry composition for a secondary battery functional layer according to claim 7.

11. A secondary battery comprising the functional layer for a secondary battery according to claim 10.

* * * * *